United States Patent
Hsu et al.

(10) Patent No.: US 7,661,732 B2
(45) Date of Patent: Feb. 16, 2010

(54) SWITCH ASSEMBLY AND FOLDABLE PORTABLE ELECTRONIC DEVICE USING SAME

(75) Inventors: Chih-Neng Hsu, Taipei Hsien (TW); Yong-Bo Tu, Shenzhen (CN)

(73) Assignees: Shenzhen Futaihong Precision Industry Co., Ltd., ShenZhen, Gangdong Province (CN); FIH (Hong Kong) Limited, Kowloon (HK)

( * ) Notice: Subject to any disclaimer, the term of this patent is extended or adjusted under 35 U.S.C. 154(b) by 75 days.

(21) Appl. No.: 11/964,769

(22) Filed: Dec. 27, 2007

(65) Prior Publication Data

US 2008/0309098 A1    Dec. 18, 2008

(30) Foreign Application Priority Data

Jun. 13, 2007    (CN) .................... 2007 1 0074955

(51) Int. Cl.
*E05C 19/16*    (2006.01)
*E05C 17/56*    (2006.01)

(52) U.S. Cl. .................................................. 292/251.5
(58) Field of Classification Search ............... 292/251.5
See application file for complete search history.

(56) References Cited

U.S. PATENT DOCUMENTS

| | | | | |
|---|---|---|---|---|
| 2,471,634 A * | 5/1949 | Mark et al. | ................... | 49/395 |
| 2,565,891 A * | 8/1951 | Sherman | ................... | 292/251.5 |
| 3,468,576 A * | 9/1969 | Beyer et al. | ............... | 292/251.5 |
| 3,596,958 A * | 8/1971 | Bowerman | ................... | 292/201 |
| 3,790,197 A * | 2/1974 | Parker | ...................... | 292/251.5 |
| 3,837,525 A * | 9/1974 | Kobayashi | ................... | 220/326 |
| 6,068,307 A * | 5/2000 | Murphy | ...................... | 292/302 |
| 6,295,702 B1 * | 10/2001 | Bauer | .......................... | 24/303 |
| 6,366,440 B1 * | 4/2002 | Kung | .......................... | 361/147 |
| 6,891,722 B2 * | 5/2005 | Chen et al. | ............. | 361/679.55 |
| 6,929,291 B2 * | 8/2005 | Chen | ....................... | 292/251.5 |
| 7,082,035 B2 * | 7/2006 | Kim | ............................ | 361/726 |
| 2005/0097711 A1 * | 5/2005 | Halstead | ....................... | 24/303 |
| 2006/0006674 A1 * | 1/2006 | Kang et al. | .............. | 292/251.5 |
| 2007/0133156 A1 * | 6/2007 | Ligtenberg et al. | .......... | 361/681 |
| 2008/0061565 A1 * | 3/2008 | Lee et al. | ................. | 292/251.5 |

FOREIGN PATENT DOCUMENTS

GB    2264975 A  *  9/1993

* cited by examiner

*Primary Examiner*—Peter M Cuomo
*Assistant Examiner*—Alyson M Merlino
(74) *Attorney, Agent, or Firm*—Steven M. Reiss

(57) ABSTRACT

A switch assembly (40) and a portable electronic device (100) are provided. The portable electronic device includes a body section (20), a cover section (10) rotatably connecting to the body section, and the switch assembly. The switch assembly includes a first magnetic component (43), a second magnetic component (45), and a movable magnetic component (47). The first magnetic component is mounted on the cover section. The second magnetic component is mounted on the body section, and attracts to the first magnetic component to maintain the portable electronic device at a closed position. The movable magnetic component is movably mounted on the body section, and repels both to the first and second magnetic. The movable magnetic component provides a repulsive force to repel the cover rotates outwards from the body section, when the magnetic component is driven to move close to the first and second magnetic components.

7 Claims, 5 Drawing Sheets

SWITCH ASSEMBLY AND FOLDABLE PORTABLE ELECTRONIC DEVICE USING SAME

BACKGROUND

1. Technical Field

The present invention relates to switch assemblies and foldable portable electronic devices using the switch assembly, particularly to a magnetic switch assembly for opening and closing a cover of a foldable portable electronic device and the foldable portable electronic device using the switch assembly.

2. Description of the Related Art

With the rapid and prosperous developments in communication technologies and the continuously upgraded living standards in the modern society, a mobile phone has become a very popular communication product among most consumers. These days, mobile phones provide an incredible array of functions, as well as a variety of the aesthetic appearances. Mobile phones can be classified into three or more types, such as bar type mobile phones, foldable type mobile phones, and slidable type mobile phones. Foldable type mobile phone is popular for its compact size and light weight as well as its large display area allowing more information to be displayed. A foldable mobile phone generally includes a cover section, a main body section, and a hinge assembly rotatably interconnecting the cover section to the main body section. The hinge assembly is configured for switching the mobile phone between an open position (namely, the cover section is flipped open from the main body section) and a closed position (namely, the cover section is overlaid on the main body section).

One kind of hinge assembly applied in a foldable mobile phone employs a cam and a follower, which allows the cover section to fold outwardly from the main body section and then stay in the open position. The hinge assembly typically includes a cam having a concave portion, a follower having a convex portion, a shaft having a fixing end, and a spring. The cam and the follower are placed around the shaft. The spring resists the follower to make the follower contact to the cam. The cam, the follower, the shaft and the spring are received in a housing. The cover section rotates about the main body of the mobile phone by overcoming the force of the spring, thus allowing the concave portion of the cam to rotate about the convex portion of the follower. However, a user must open a foldable mobile phone using both hands. This makes foldable mobile phone inconvenient to use in situations when the user has only one hand free.

In order to satisfy the desire for easily opening and closing a foldable mobile phone using one hand, foldable mobile phones incorporated with an automatic hinge assembly are provided. However, the automatic hinges used in the mobile phones tend to have a complicate structure, which, accordingly, makes manufacture process for producing the automatic hinge time consuming, and increase the cost of the production thereof.

Therefore, a switch assembly for opening and closing a cover section of a foldable portable electronic device and the foldable portable electronic device are desired in order to overcome the above-described problems.

SUMMARY

In one aspect thereof, a switch assembly used in a foldable electronic device is provided. The foldable electronic device includes a cover section, a body section, a hinge assembly pivotely connecting the cover section to the body section, and said switch assembly. The switch assembly includes a first magnetic component mounted on the cover section; a second magnetic component mounted on the body section, and a movable magnetic component movably mounted on the body section. The first magnetic component and the second magnetic component attract with each other to maintain a close position of the portable electronic device. The movable magnetic component repels to both the first and second magnetic components. The movable magnetic component provides a repulsive force to repel the cover rotate outwards from the body section, when the magnetic component is pressed to move close to the first and second magnetic components.

In another aspect thereof, a foldable portable electronic device is provided. The foldable electronic device includes a cover section, a body section, a hinge assembly pivotely connecting the cover section to the body section, and a switch assembly. The switch assembly includes a first magnetic component mounted on the cover section; a second magnetic component mounted on the body section, and a movable magnetic component movably mounted on the body section. The first magnetic component and the second magnetic component attract with each other to maintain a close position of the portable electronic device. The movable magnetic component repels to both the first and second magnetic components. The movable magnetic component provides a repulsive force to repel the cover rotate outwards from the body section, when the magnetic component is pressed to move close to the first and second magnetic components.

Other advantages and novel features will become more apparent from the following detailed description when taken in conjunction with the accompanying drawings.

BRIEF DESCRIPTION OF THE DRAWINGS

Many aspects of the present switch assembly for opening and closing covers and foldable portable electronic device using same be better understood with reference to the following drawings. The components in the drawings are not necessarily drawn to scale, the emphasis instead being placed upon clearly illustrating the principles of the switch assembly for opening and closing covers and foldable portable electronic device using same. Moreover, in the drawings, like reference numerals designate corresponding parts throughout the several views.

DETAILED DESCRIPTION OF THE PREFERRED EMBODIMENT

Figure 1:
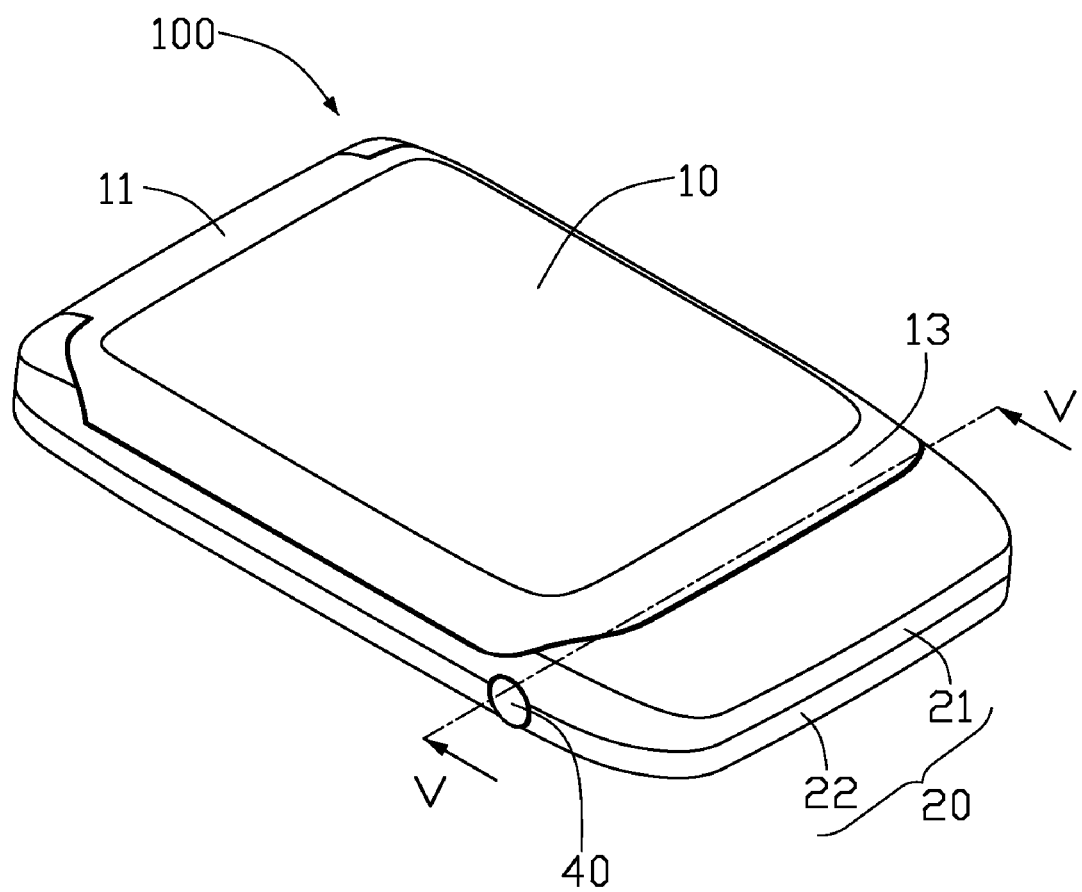
FIG. 1 is a schematic, perspective view of a foldable portable electronic device incorporating with a switch assembly therein according to a present embodiment, wherein the foldable portable electronic device maintains in a closed position.
Figure 2:
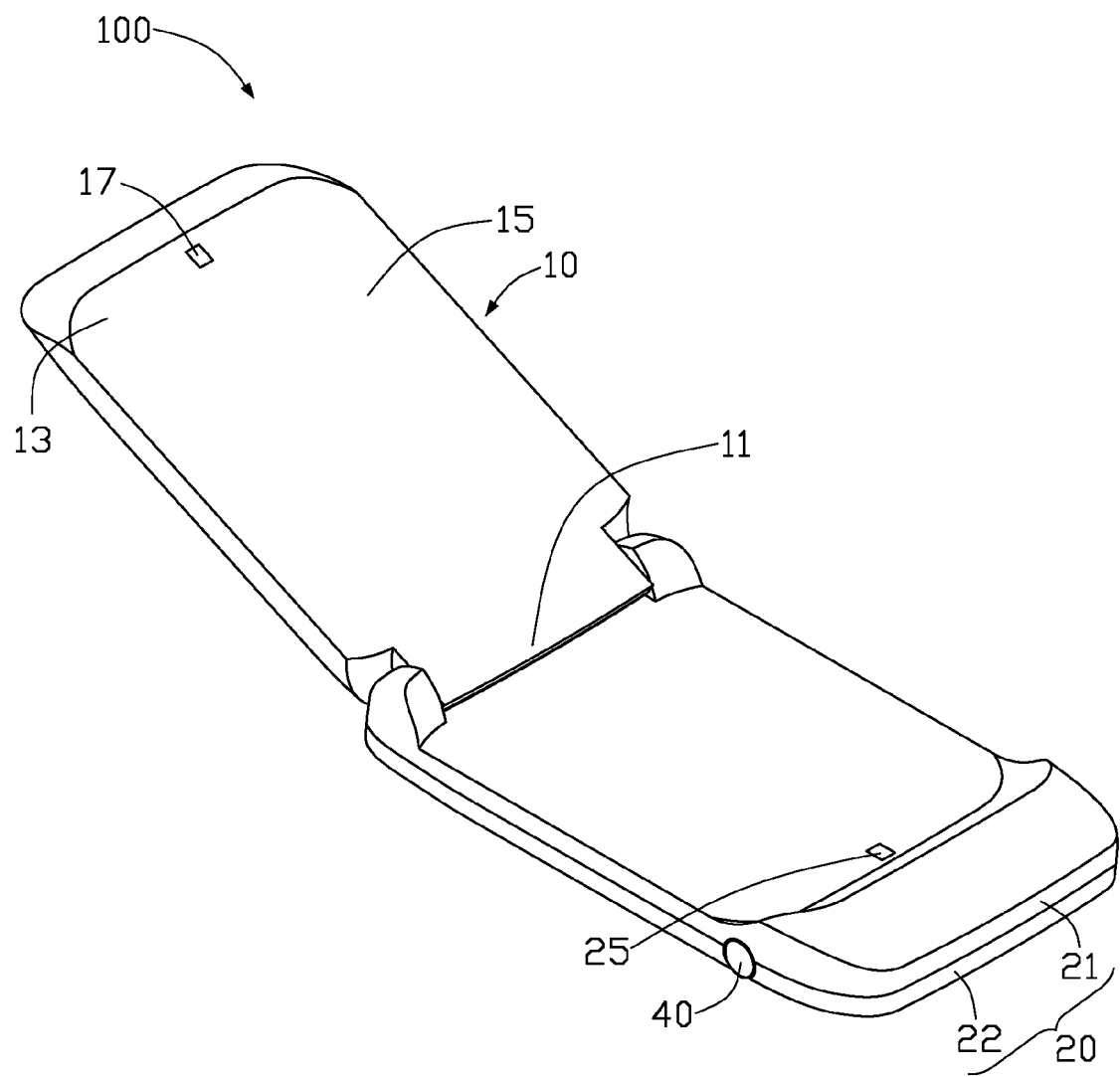
FIG. 2 is similar to FIG. 1, but shows the foldable portable electronic device maintaining in an open position.

Referring now to the drawings in detail, FIGS. 1 and 2 show a foldable electronic device 100 incorporated with a switch assembly 40 therein, in accordance with a present embodiment. The foldable portable electronic device 100 can be, for example, a flip type or foldable type mobile phone, personal digital assistant (PDA), or handheld computer. The foldable portable electronic device 100 essentially includes a cover section 10, a main body section 20, a hinge assembly (not shown) configured to pivotably/rotatably couple the cover section 10 and the main body section 20, and the switch assembly 40. The switch assembly 40 is configured (i.e. structured and arranged) for holding the cover section 10, thus keeping the portable electronic device 100 in a closed position as shown in FIG. 1, and releasing the cover section 10, thus allowing the portable electronic device 100 to be in an open position as shown in FIG. 2. When the portable electronic device 100 is in the closed position, the cover section 10 is overlaid on the main body section 20. Due to the force of the hinge assembly, the cover section 10 can automatically flip open from the main body section 20.

The cover section 10 has an inner end 11, an external end 13, and an inner surface 15. The inner end 11 and the external end 13 are located at two opposite ends of the cover section 10. The inner end 11 is configured to pivotably connect to the main body section 20. The external end 13 can be operated by a user to open or close the portable electronic device 100. The inner surface 15 overlies on the main body section 20 when the foldable portable electronic device 100 is in the closed position. The inner surface 15 has a first notch 17 defined therein, in the external end 11. The first notch 17 is a rectangular concave recessed in the inner surface 15.

Figure 3:
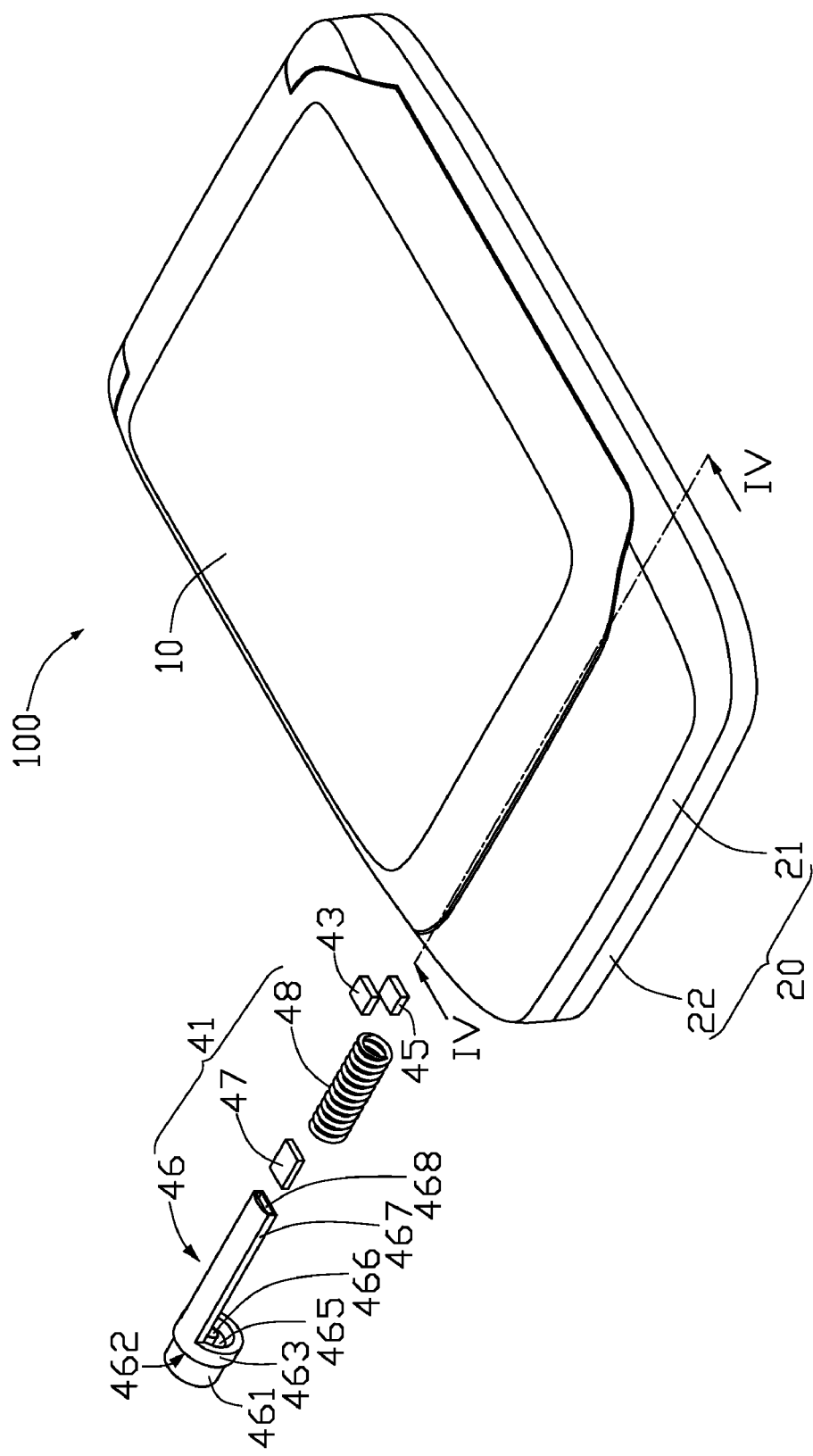
FIG. 3 shows a disassembled view of the switch assembly of the foldable portable electronic device of FIG. 1.
Figure 4:
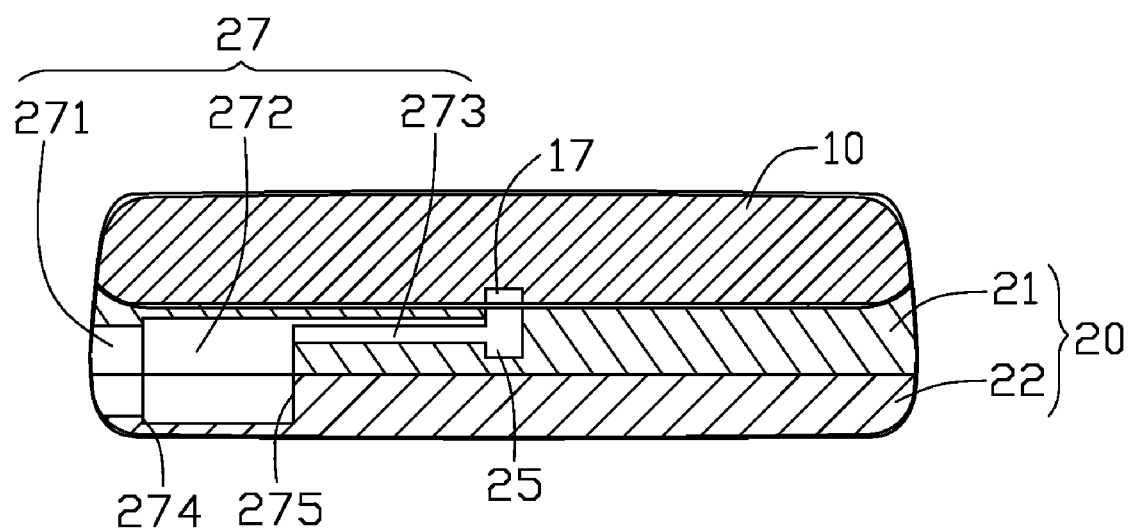
FIG. 4 shows a cross-sectional view taken along line IV-IV of FIG. 3.
Figure 5:
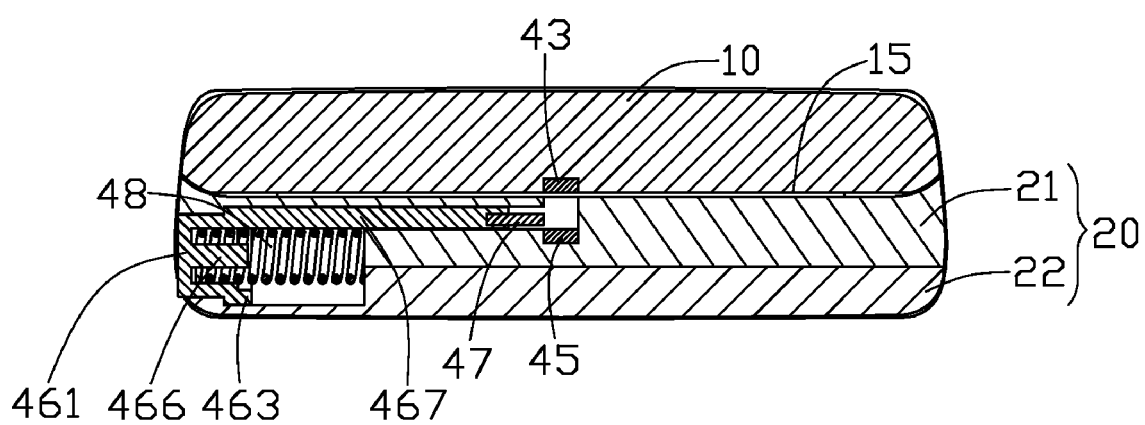
FIG. 5 shows a cross-sectional view taken along line V-V of FIG. 1.

Also referring to FIGS. 3-4, the main body section 20 includes an inner housing 21, an external housing 22, a second notch 25, and a receiving cavity 27. The inner housing 21 and the external housing 22 are mounted to each other, and thus forming the receiving cavity 27, and a receiving space (not shown) therein to incorporate electronic components such as printed circuit board (PCB) therein. The inner housing 21 faces toward the inner surface 15 of the cover section 10 when the foldable portable electronic device 100 is in the closed position. The second notch 25 is defined in the inner housing 21, and is positioned corresponding to the first notch 17. The receiving cavity 27 is configured for receiving the switch assembly 40 therein, and includes a first cavity 271, a second cavity 272, and a longitudinal slot 273 defined in that order from external to internal of the main body section 20. The first cavity 271 and the second cavity 272 both are cylindrical vacant voids. However, both of the first cavity 271 and the second cavity 272 are divided into two portions by the inner housing 21 and the external housing 22, that is, the first cavity 271 and the second cavity 272 both have a portion defined in the inner housing 21, and another portion defined in the external housing 22. The second cavity 272 has a diameter larger than that of the first cavity 271, and thereby forming a step surface 274 between the first cavity 271 and the second cavity 272. The slot 273 is longitudinally defined in the inner housing 21, and communicates with both the second cavity 272 and the second notch 25, thereby forming an end sidewall 275 between the second cavity 272 and the slot 273. The end sidewall 275 oppositely faces to the step surface 274.

The switch assembly 40 includes a control assembly 41, a first magnetic component 43, and a second magnetic component 45. The first magnetic component 43 and the second magnetic component 45 both are bar/axial magnet, and are respectively situated inside the first notch 17 and the second notch 25. The first magnetic component 43 has a first magnetic pole disposed near the inner surface 15. The second magnetic component 45 has a second magnetic pole face towards the first magnetic pole of the first magnetic component 43. The second magnetic pole of the second magnetic component 45 has a polarity opposite to the polarity of the first magnetic pole of the first magnetic component 43. Thus, when the foldable portable electronic device 100 is closed, the first magnetic component 43 and the second magnetic 45 matingly attract to each other.

The control assembly 41 includes a pressing section 46, a third magnetic component 47, and an elastic member 48. The pressing section 46 includes a button 461, a stop portion 463, and a beam 467, wherein the button 461 and the beam 467 are disposed at two opposite ends of the stop portion 463. The button 461 is configured for being pressed by a user. The button 461 is cylindrical, has a length slightly longer than the length of first cavity 271, so that an end of the button 461 can extend outwardly from the first cavity 271 when the button 461 is received in the first cavity 271. The stop portion 463 is cylindrical, and has a diameter approximately equal to that of the second cavity 272, that is, the stop portion 463 has a diameter larger than that of the button 461, thereby forming a stop surface 462 from which the button 461 projects. The stop surface 462 can abut against the step surface 274, so as to prevent the pressing section 46 detaching from the main body section 20. The stop portion 463 further has annular groove 465 recessed in an end surface opposite to the stop surface 462, and thus forming a pole 466 surrounded by the annular groove 465. The beam 467 longitudinally extends from the end surface of stop portion 463 and has a receiving groove 468 defined therein. The receiving groove 468 is recessed in a distal end of the beam 467, and is positioned far away from the stop portion 463.

The third magnetic component 47 should preferably be a bar/axial magnet, and is received in the receiving groove 468 of the beam 467. The third magnetic component 47 has a third magnetic pole disposed towards the first magnetic component 43, and a fourth magnetic pole disposed towards the second magnetic component 45. The third magnetic pole has a polarity same to the first magnetic pole of the first magnetic component 43, and the fourth magnetic pole has a polarity same to the second magnetic pole of the second magnetic component 45.

The elastic member 48 can preferably be a compressing spring. The elastic member 48 is received in the second cavity 272. One end of the elastic member 48 is received in the annular slot 465 of the press section 461 and surrounds the pole 466, and can abut against the stop portion 463. An opposite end of the elastic member 48 can abut against the end sidewall 275. The elastic member 48 is configured for providing rebound force for driving the pressing section 46 to rebound to a less compressed status.

In assembly, firstly the first and second magnetic components 43, 45 are respectively situated in the first notch 17 of the cover section 10 and the second notch 25 of the body section 21. Then, the pressing section 46 is assembled. The elastic member 48 is mounted to the pressing section 46, with one end thereof being inserted into the annular groove 465 and surrounding the pole 466. The third magnetic member 47 is securely received inside the receiving groove 468 of the beam 467. At last, the assembled pressing section 46 is mounted to the inner housing 21, and subsequently, the inner housing 21 is attached to the external housing 22 to secure the pressing section 46 therein. The button 41 and the stop portion 43 are respectively received in the first and second cavity 271, 272. The elastic member 48 is sandwiched between the stop portion 463 and the end sidewall 275, and is compressed to push the stop portion 463 abutting against the step surface 274. The beam 47 of the pressing section 46 is inserted into the longitudinal slot 273, and the third magnetic component 47 is positioned near the first and second magnetic component 43, 45 with the third magnetic pole close to the first magnetic component and the fourth magnetic pole close to the second magnetic component.

In use, when the portable electronic device 100 is in the closed position as shown in FIG. 1 and FIG. 4, the first magnetic pole of the first magnetic component 43 and the second magnetic pole of the second magnetic component 45 having opposite polarities are matingly attracted to each other. The third and fourth magnetic poles of the third magnetic component 47 respectively face towards the first magnetic pole of the first magnetic component 43 and the second magnetic pole of the magnetic component 45 except that the third magnetic component 47 is disposed at the sides of the first and second magnetic components 43, 45, namely, the third magnetic component 47 is staggered with the first and second magnetic components 43, 45. The attractive force between the first magnetic component 43 and the second component 45 is larger than the repulsive force between the third magnetic component 47 and the first and second magnetic component 43, 45 together with the force of the hinge assembly to outwards rotate the cover section 10 from the body section 20.

When a user presses the button 461, the third magnetic component 47 is correspondingly further inserted inside the receiving cavity 27 and becomes being disposed between the first and second magnetic component 43, 45. Accordingly, the repulsive force between the third magnetic component 47 and the first second magnetic component 43, 45 becomes larger and larger. When the force of hinge assembly together with the repulsive force between the third magnetic component 47 and the first magnetic components 43 become larger than the attractive force between the first and second magnetic components 43, 45, the cover section 10 is automatically repelled to rotate from the body section 20 to the open position of the portable electronic device 100 due to the force of the hinge assembly. The user can then stop pressing the button 461.

The portable electronic device 100 advantageously incorporates a hinge assembly having relatively simple structure and the switch assembly 40 to achieve the purpose of automatically opening the foldable portable electronic device 100. Since the structure of the switch assembly 40 is simple, the process for making and assembly the switch assembly is correspondingly simple. Therefore, cost of production of the portable electronic device 100 is decreased.

It is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. A portable electronic device comprising:
   a body section;
   a cover section rotatably connecting to the body section; and
   a switch assembly comprising:
      a first magnetic component mounted on the cover section;
      a second magnetic component mounted on the body section, and attracting to the first magnetic component to maintain the portable electronic device in a closed position;
      a pressing section movably mounted to the body section, the pressing section comprising a button exposed from the body section, and a beam extending towards the first and second magnetic components and defining a receiving groove therein;
      an elastic member configured to provide a rebounding force to the pressing section; and
      a movable magnetic component received in the receiving groove, and repelling both the first and second magnetic components, the movable magnetic component being configured to provide a repulsive force to repel the cover to rotate outwards from the body section when the movable magnetic component is driven to move close to the first and second magnetic components.

2. The portable electronic device as claimed in claim 1, wherein the cover section has a first notch defined in an external end thereof to receive the first magnetic component, and the body section has a second notch defined therein to receive the second magnetic component.

3. The portable electronic device as claimed in claim 1, wherein the pressing section further comprises a stop portion disposed between the button and the beam, and the stop portion has a stop surface from which the stop portion projects.

4. The portable electronic device as claimed in claim 3, wherein the body section has a receiving cavity defined therein to receive the pressing section therein, and the receiving cavity has a first cavity to receive the button, a second cavity to movably receive the stop portion, and a longitudinally slot to receive the beam.

5. The portable electronic device as claimed in claim 4, wherein the receiving cavity further has a step surface formed between the first cavity and second cavity, and the step surface abuts against the stop surface of the stop portion to prevent the pressing section from drop out from the receiving cavity.

6. The portable electronic device as claimed in claim 5, wherein the receiving cavity further has an end surface formed between the second cavity and the longitudinally slot.

7. The portable electronic device as claimed in claim 5, wherein the elastic member is sandwiched between the stop portion of the pressing section and the end wall of the receiving cavity.

* * * * *